United States Patent [19]

Kuwana

[11] 4,043,664
[45] Aug. 23, 1977

[54] INTERLINEAR FEEDER FOR COPYING MACHINE

[75] Inventor: Toshitsugu Kuwana, Mito, Japan

[73] Assignee: Rank Xerox Ltd., London, England

[21] Appl. No.: 698,373

[22] Filed: June 21, 1976

[30] Foreign Application Priority Data

July 16, 1975  Japan .................................. 50-98589

[51] Int. Cl.² ............................................ G03B 27/62
[52] U.S. Cl. .................................................... 355/75
[58] Field of Search ....................... 271/114; 355/7, 14, 355/48, 50, 75, 77, 40

[56] References Cited

U.S. PATENT DOCUMENTS

| | | | |
|---|---|---|---|
| 2,740,324 | 4/1956 | Cahill | 355/40 |
| 3,078,770 | 2/1963 | Hunt et al. | 355/14 |
| 3,409,357 | 11/1968 | Lavander | 355/7 |
| 3,544,212 | 12/1970 | Umahashi et al. | 355/75 X |
| 3,620,618 | 11/1971 | White | 355/7 X |
| 3,669,536 | 6/1972 | Scott | 355/40 |
| 3,880,521 | 4/1975 | Eppe et al. | 355/40 |

*Primary Examiner*—Donald A. Griffin

[57] ABSTRACT

An interlinear feeder for use in a copying machine wherein an original to be copied is moved stepwise at a predetermined interval with a mask being disposed thereunder, characterized in that a member driven in connection with the motion of the original is equipped with a predetermined number of pitch change plates arranged in parallel and having protrusions formed at individually different intervals, and limit switches, each of which is disposed opposite to the protrusions of the corresponding pitch change plate, are connected respectively to the contact circuits of a selector switch provided in an original-feed control circuit.

9 Claims, 4 Drawing Figures

INTERLINEAR FEEDER FOR COPYING MACHINE

The present invention relates to an original document feeder for use in a copying machine wherein an original to be copied is moved stepwise at a predetermined interval over the imaging area of the copier and more particularly to an improved such feeder capable of setting the predetermined step interval or interlinear space by electric signals from a simplified apparatus.

In the conventional copying machine accessory or attachment where a mask is disposed under an original and the lines thereof to be copied are changed by feeding the original stepwise at a predetermined interval, one such interlinear feeder employed to drive the original has been a mechanical type consisting of a combination of gears or the like, with some disadvantages including difficulty in changing the interlinear interval and reliability. Multiple electrical switch cam bank controller mechanisms are, of course, generally known for xerographic machine controllers and programmers, e.g., U.S. Pat. No. 3,724,943, issued Apr. 3, 1973, FIG. 10.

In contrast, in the apparatus disclosed herein, a member interlocked with the original document drive mechanism is provided with a plurality of pitch change plates, each having protrusions formed at a predetermined interval different from that of any other plate, and a limit switch provided opposite to the protrusion side of each pitch change plate is actuated by on-off signals to control the motion of the original. Thus, the number of mechanical elements in the original drive mechanism can be minimized to reduce the occurrence of faults.

The features and advantages of the invention will be more fully understood by reference to the following detailed description of one exemplary embodiment thereof, including the drawings illustrating this embodiment, wherein.

Figure 1:
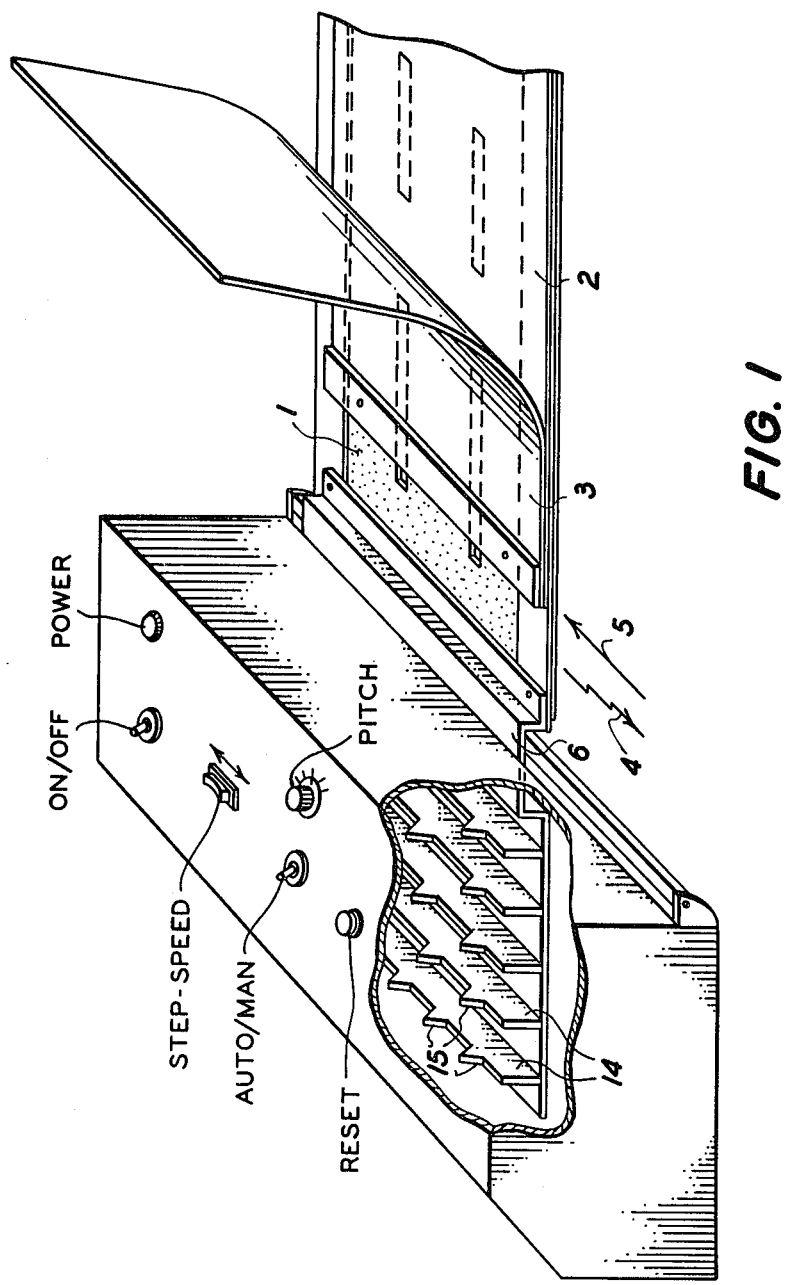
FIG. 1 is a perspective view of an exemplary embodiment of the present invention.
Figure 2:
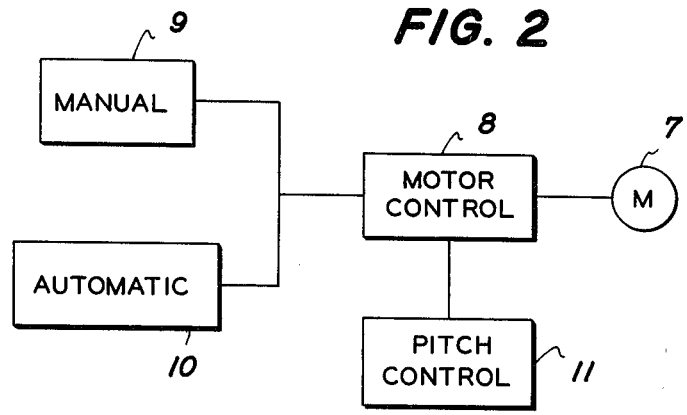
FIG. 2 is a circuit block diagram of the electrical controls and drive system of said embodiment.
Figure 3:
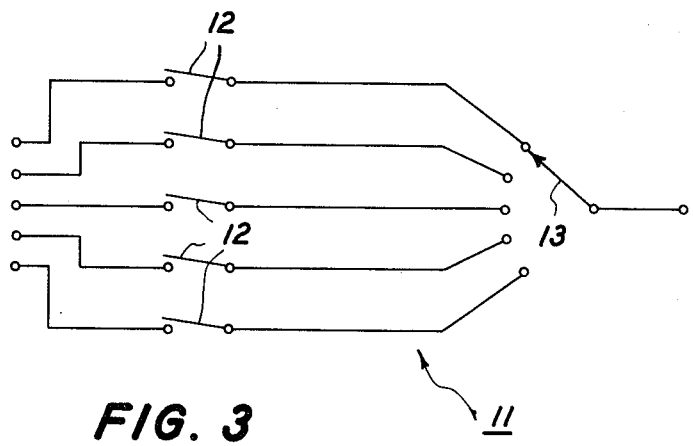
FIG. 3 is a circuit diagram of the pitch setting circuit of said embodiment.

The exemplary embodiment of the present invention will now be described with reference to the FIGS. 1 - 4. The block diagram of FIG. 2 shows the configuration of a circuit for actuating a drive motor 7 driving drive member 6 in FIG. 1 attached fixedly to a holder 3 in such a manner that an original 2 slid over a mask 1 by the holder 3 is moved stepwise at a predetermined interval in the direction of a solid-line arrow 4 and is returned to the starting position as indicated by a solid-line arrow 5. The drive member 6 may be conventionally attached to the rack side of a rack and pinion combination (not shown), and the pinion attached to the drive shaft of a motor 7, to which a motor control circuit 8 is connected. Any other appropriate simple drive connection of the motor to the original holder 3 may be used.

Further referring to FIG. 2, a manual signal circuit 9 and an automatic signal circuit 10 are connected to the motor control circuit 8, to which is also connected a pitch setting circuit 11 serving to control the motion of the original 2. The pitch setting circuit 11 (see FIG. 3) consists of a predetermined number (equal to the number of pitch change plates which will be described below) of individual limit switches 12, each connected to one of plural input switch contacts of a selector switch 13.

Figure 4:
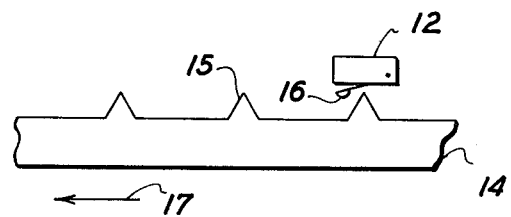
FIG. 4 is a partial plan view illustrating the relationship between a pitch change plate and a limit switch in said embodiment.

As illustrated, partially in FIG. 4, each limit switch 12 is disposed opposite to protrusions 15 formed at predetermined intervals along each of a predetermined number of pitch change plates 14 attached to the rack. When the pitch change plate 14 is moved in the direction of the solidline arrow 17 in FIG. 4, each protrusion 15 pushes an actuating lever 16 of the limit switch 12 to turn on the switch, from which a signal is applied to the motor control circuit 8.

With the above-described configuration, when an original feed command is generated from the manual signal circuit 9, or when an original feed command is generated from the automatic signal circuit 10 upon reception of a copy completion signal from the copying machine, then the motor control circuit 8 is placed in operation to drive the motor 7, thereby moving the document holder 3. At this same moment, the pitch change plate 14 is moved together with the holder 3, so that the next protrusion 15 serves to turn on the limit switch 12, whose signal is received to stop the motor 7.

The protrusions 15 are formed at different constant intervals (as, for example, 8.5, 10, and 12.5mm) along the individual pitch change plates 14. Thus, the original moving pace or interline feed pitch is rendered easily settable to a desired value through changeover of the selector switch 13 alone. Consequently, the mechanical components are merely those required to connect the motor 7 with the drive member 6, and all other components can be simple electric circuits, to simplify the configuration and potentially reduce the occurrence of faults.

If a presettable counter is inserted in or connected to the automatic signal circuit 10, and on-off signals from microswitch 12 in the pitch setting circuit 11 are applied as an input to that preset counter, a command may be applied to the motor control circuit 8 upon completion of copying a desired number of lines previously set in the counter, so that the motor is then rotated in a predetermined direction to return the holder 3 to a selected starting point upon the completion of the count.

Thus, in accordance with the present invention, a mechanism for feeding an original stepwise at a predetermined pitch in a copying machine may consist substantially of electric circuits to perform the operation. Therefore, it offers advantages in attaining a simplified configuration, easier setting of the original feed pitch, and a reduction of fault occurrences.

In conclusion, there has been disclosed herein in apparatus for advancing an image-bearing member in steps across the imaging area of a copy apparatus by drive means, the improvement comprising a plurality of step control members integrally movable with said image-bearing member, where each step control member has a multiplicity of spaced switch actuating means thereon, and where these switch actuating means are differently spaced on different step control members, and where a plurality of individual switches are positioned for actuation by the switch actuating means by movement of an individual step control member past a switch, and further including a multiple contact selector switch for selecting between the individual switches for electrically connecting a selected one of the switches to the drive means to control the drive means for a selected incremental step movement of the image-bearing member by the drive means. It has been further shown that the step control members can be simple elongate cam plates corresponding in length to the imaging area of the copying apparatus with serially spaced incremental discontinuities thereon providing the switch actuating means, with the discontinuities on each cam plate having a uniform pitch spacing, but wherein the pitch spacing is different on each cam plate. The cam plates may be all parallel to one another and commonly integrally connected to one another and to the image-bearing member.

The disclosed apparatus further includes an apertured optical mask adapted to overlie said imaging area of the copying apparatus, and the image-bearing member may be incrementally advanced by the drive means in steps with spacings equal to the spacings between the switch actuating means on the selected one of the step control members which has been selected by the selector switch. The pitch spacings between the switch actuating means may be equal to a preselected spacings of lines of image indicia on the image-bearing member to be copied.

Various advantages and applications, in addition to those described above, will be apparent to those skilled in the art from the above-described apparatus details. While the embodiment disclosed herein is generally considered to be preferred, numerous variations and modifications will be apparent to those skilled in the art. The following claims are intended to cover all such variations and modifications as fall within the true spirit and scope of the invention.

What is claimed is:

1. In an apparatus for advancing an image-bearing member in steps across the imaging area of a copying apparatus by drive means, the improvement comprising:
    a plurality of step control members integrally movable with said image-bearing member,
    each said step control member having a multiplicity of incrementally spaced switch actuating means thereon,
    said switch actuating means being differently spaced on different said step control members;
    a plurality of individual switch means positioned for actuation by said switch actuating means by movement of an individual said step control member past said individual switch means; and
    selector means for selecting between said individual switch means and connecting the selected switch means with said drive means for controlling said drive means for a selected incremental step movement of said image-bearing member by said drive means.

2. The apparatus of claim 1, wherein said step control members are elongate cam plates with serially spaced discontinuities thereon providing said switch actuating means.

3. The apparatus of claim 1, wherein said respective switch actuating means on each said step control member has an equal pitch spacing, and wherein said pitch spacing is different on each said step control member.

4. The apparatus of claim 1, wherein said selector means is a multiple contact switch for electrically connecting a selected one of said individual switch means to said drive means.

5. The apparatus of claim 1, wherein said step control members are elongate cam plates corresponding in length to the imaging area of the copying apparatus, wherein said step control members are parallel one another and commonly integrally connected.

6. The apparatus of claim 1, further including an apertured optical mask adapted to overlie said imaging area of the copying apparatus, wherein said image-bearing member is incrementally advanced by said drive means in steps with spacings equal to the spacings between said switch actuating means on the said step control member selected by said selector means.

7. The apparatus of claim 6, wherein said switch actuating means on each said step control member have a uniform pitch spacing, and wherein said pitch spacing is different on each said step control member.

8. The apparatus of claim 6, wherein said step control members are elongate cam plates with spaced protrusions thereon providing said switch actuating means.

9. The apparatus of claim 6, wherein said spacings between said switch actuating means are equal to preselected spacings of lines of indicia on said image-bearing member to be copied.

* * * * *